(12) United States Patent
Vieville (10) Patent No.: US 9,924,810 B2
(45) Date of Patent: Mar. 27, 2018

(54) ELECTRONIC SMART SHELF DISPLAY

(71) Applicant: CONEX DIGITAL LLC, Melville, NY (US)

(72) Inventor: Jean Vieville, Melville, NY (US)

(73) Assignee: Conex Digital LLC, Melville, NY (US)

(*) Notice: Subject to any disclaimer, the term of this patent is extended or adjusted under 35 U.S.C. 154(b) by 0 days.

(21) Appl. No.: 15/225,532

(22) Filed: Aug. 1, 2016

(65) Prior Publication Data
US 2018/0027995 A1   Feb. 1, 2018

(51) Int. Cl.
| | |
|---|---|
| G09F 13/04 | (2006.01) |
| A47F 11/10 | (2006.01) |
| A47F 5/00 | (2006.01) |
| A47F 5/08 | (2006.01) |
| G02F 1/1335 | (2006.01) |
| G09G 5/10 | (2006.01) |
| G09G 5/00 | (2006.01) |
| G06F 3/14 | (2006.01) |
| G06F 3/147 | (2006.01) |

(52) U.S. Cl.
CPC .......... *A47F 11/10* (2013.01); *A47F 5/0043* (2013.01); *A47F 5/08* (2013.01); *G02F 1/1336* (2013.01); *G06F 3/147* (2013.01); *G06F 3/1438* (2013.01); *G09G 5/006* (2013.01); *G09G 5/10* (2013.01); *G09G 2320/0626* (2013.01); *G09G 2370/12* (2013.01); *G09G 2380/04* (2013.01)

(58) Field of Classification Search
CPC .......... A47F 11/10; A47F 5/0043; A47F 5/08; G02F 1/1336
USPC ....................................... 362/97.3
See application file for complete search history.

(56) References Cited

U.S. PATENT DOCUMENTS

| | | |
|---|---|---|
| 5,297,486 A | 3/1994 | Herrmann et al. |
| 5,448,226 A | 9/1995 | Failing, Jr. et al. |

(Continued)

FOREIGN PATENT DOCUMENTS

| | | |
|---|---|---|
| JP | 2005099888 | 4/2005 |
| KR | 20150142978 | 12/2015 |
| KR | 20160066357 | 6/2016 |

OTHER PUBLICATIONS

ShapedMedia, Shelf Edge Media SM-28 LCD, La Jolla, California, ShapedMedia.com, 2016.

(Continued)

*Primary Examiner* — Bryon T Gyllstrom
(74) *Attorney, Agent, or Firm* — Gottlieb, Rackman & Reisman, PC (57) ABSTRACT

A merchandise display assembly comprises a tier of horizontally elongated metallic shelving for merchandise, with a display assembly detachably coupled at each shelf to an LED TV display of the merchandise. Each elongated LED TV display comprises an LCD screen comprised of 1920×95 pixels backlit by white light emitting LEDs, and projecting white LED lighting to illuminate the merchandise below each LED TV display, said LED TV displays each driven by an elongated compact HDMI or daisy chained controller board. The face of the display is arranged to have maximal area by confining vertical drivers to a compact upper region, permitting the boarder of the region to be of equal thickness both above and below the display and by providing a back cover that extends only to the rear surface of the display element.

6 Claims, 10 Drawing Sheets

(56) References Cited

U.S. PATENT DOCUMENTS

| | | | |
|---|---|---|---|
| 6,276,810 B1* | 8/2001 | Vosshenrich | A47F 11/10 362/125 |
| 6,288,701 B1* | 9/2001 | Karp | G06F 3/147 345/685 |
| 6,543,688 B1* | 4/2003 | Massaro | A47F 5/0068 235/383 |
| 7,287,001 B1* | 10/2007 | Falls | G06Q 10/087 235/383 |
| 2002/0034067 A1* | 3/2002 | Massaro | A47F 5/0068 361/728 |
| 2003/0136832 A1* | 7/2003 | Massaro | A47F 5/0068 235/383 |
| 2004/0195192 A1 | 10/2004 | Belokin et al. | |
| 2005/0030158 A1* | 2/2005 | Schulmerich | G06F 3/1462 340/5.91 |
| 2006/0279527 A1 | 12/2006 | Zehner et al. | |
| 2008/0304252 A1* | 12/2008 | Shibusawa | A47F 3/001 362/125 |
| 2009/0204479 A1 | 8/2009 | Wolinsky et al. | |
| 2011/0204009 A1* | 8/2011 | Karan | A47F 1/12 211/59.2 |
| 2014/0139548 A1* | 5/2014 | Byers | G06F 3/1431 345/619 |
| 2014/0257946 A1* | 9/2014 | High | G06Q 30/0241 705/14.4 |
| 2014/0344430 A1 | 11/2014 | Ayanam et al. | |
| 2016/0048907 A1* | 2/2016 | Park | G06Q 30/02 345/634 |

OTHER PUBLICATIONS

Korean Intellectual Property Office (KIPO), Notice of Preliminary Rejection for corresponding application No. 10-2017-0163344, dated Jan. 20, 2018.

* cited by examiner

ELECTRONIC SMART SHELF DISPLAY

FIELD OF THE INVENTION

The present invention related to a merchandise display assembly.

BACKGROUND OF THE INVENTION

The display of merchandise is typically accompanied by labeling indicating price and other relevant information. Sometimes the labeling is presented on rear projection systems, on which it is possible to update pricing and other information. Because of the availability of inexpensive small TV screens, labelling devices may also comprise a series of small TVs placed next to each other and held together on an elongated structure, having a dead space between them, which may be consistent with separated items that they are intended to display.

In at least one embodiment a continuous, elongated TV screen has made it possible to display advertising material along a horizontal shelf. However such devices are subject to manufacturing constraints that have not been optimally resolved. In particular, the arrangement of necessary projection and/or circuit components behind the screen are relatively bulky, thereby consuming a portion of the space available to display the actual merchandise available for sale.

An important consideration for display screens is difference between the outline dimensions of a display and the active area on which the useful image is displayed. For example, the outline dimensions may include a bezel necessary to retain the screen and to enclose circuit elements necessary for the display, such as the vertical drivers of a typical LED TV screen. In general what is needed is a display in which the active area of the display is maximized.

In addition, the full benefits of an improved display system have not been developed. For example, where there are multiple shelves stacked in a tier, the need to provide separate wiring for each level is a feature of the present systems. Also, the complexity of advanced features such as video triggering through facial recognition have not been addressed.

BRIEF DESCRIPTION OF THE INVENTION

A merchandise display assembly comprises a tier of horizontally elongated plastic or metallic shelving, preferably aluminum, for merchandise, with a display detachably coupled at each shelf providing an LED TV display of the merchandise. Here, each level of the tier is a row placed one above or below the other, which may or may not successively recede or diminish in size. The display assembly comprises a plurality of elongated LED TV displays, each said LED TV display extending in front of and below its respective shelf for substantially the length of each shelf, having a height substantially less than the vertical distance between the shelves, and having a depth substantially less than the depth of each said shelf, wherein each display permits merchandise to be accessible behind the display on each shelf. Each elongated LED TV display comprises an LCD screen comprised of for example 1920×95 pixels backlit by white light emitting LEDs, and projecting white LED light to illuminate the merchandise under and below each LED TV display. The LED TV displays are each driven by an elongated compact HDMI or daisy chained electronic controller board. Each tier row electronic controller can be daisy chained to its next row electronic controller thereby simplifying assembly and allowing all rows to be driven by a single power source.

The display has an active display area on which a TV image can be made to appear. The TV image is enabled by vertical column and horizontal row drivers that activate or deactivate pixel elements. The active display area is surrounded by a metallic bezel that at least in part covers the drivers. The dimensions of the display includes the active display area and the area of the bezel. The active display area is arranged to have maximal area by confining vertical drivers to a compact upper region, permitting the boarder of the region i.e. bezel areas to be of equal thickness both above and below the display. Behind the display and its controller board is a rear support having the shape of a parallelepiped open on a face that captures the controller board and bears against the rear of the display. The design further optimizes the active display area by having the configuration of the rear support not capture the display itself within the rear support.

DETAILED DESCRIPTION OF PREFERRED EMBODIMENTS

Figure 1:
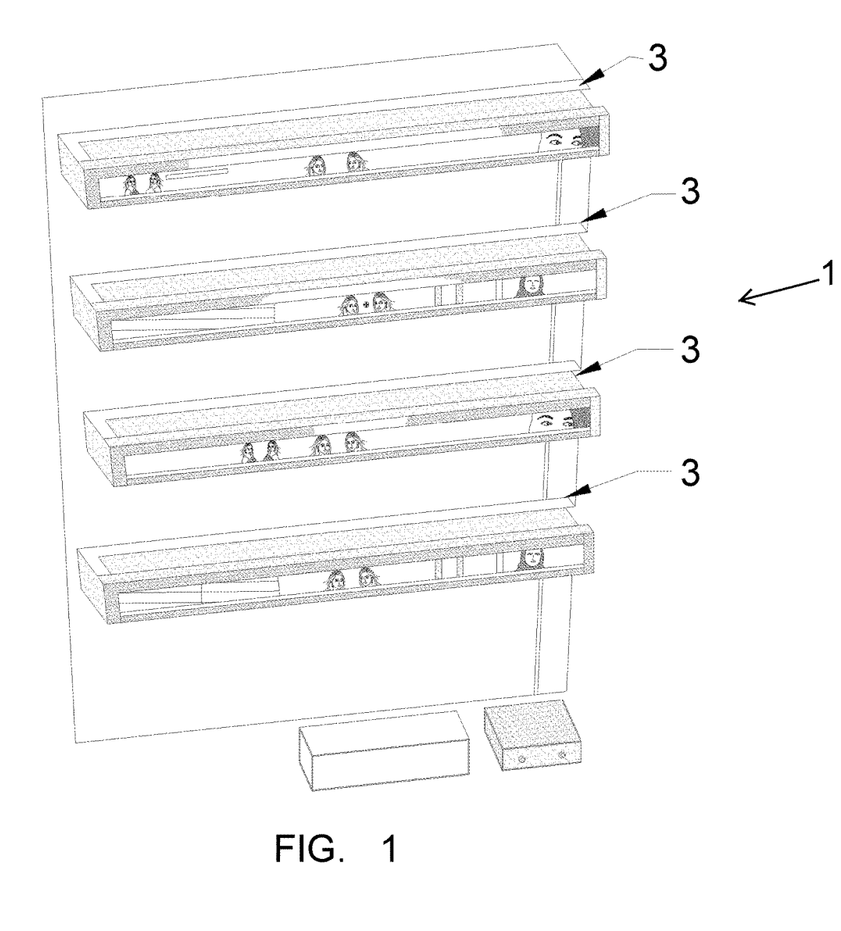
FIG. 1 is a perspective view of a display tier arrangement.
Figure 2:
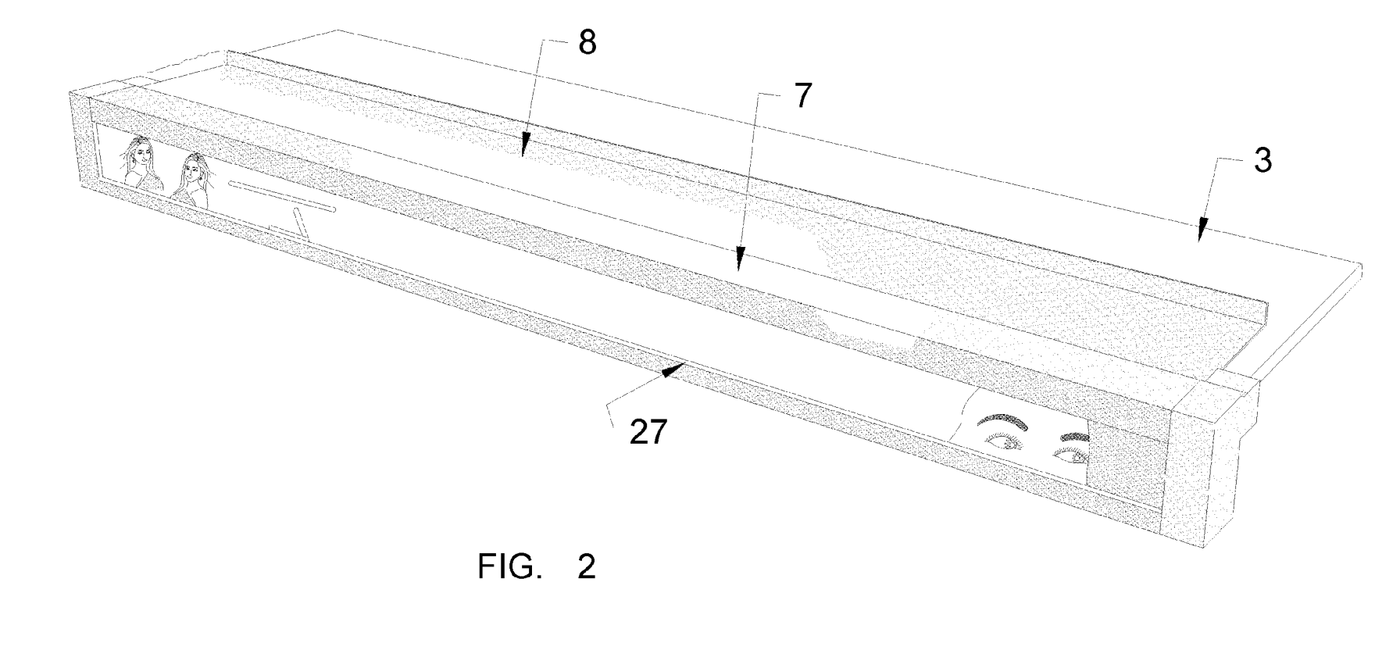
FIG. 2 is a single display element shown positioned with respect to a shelf.
Figure 3:
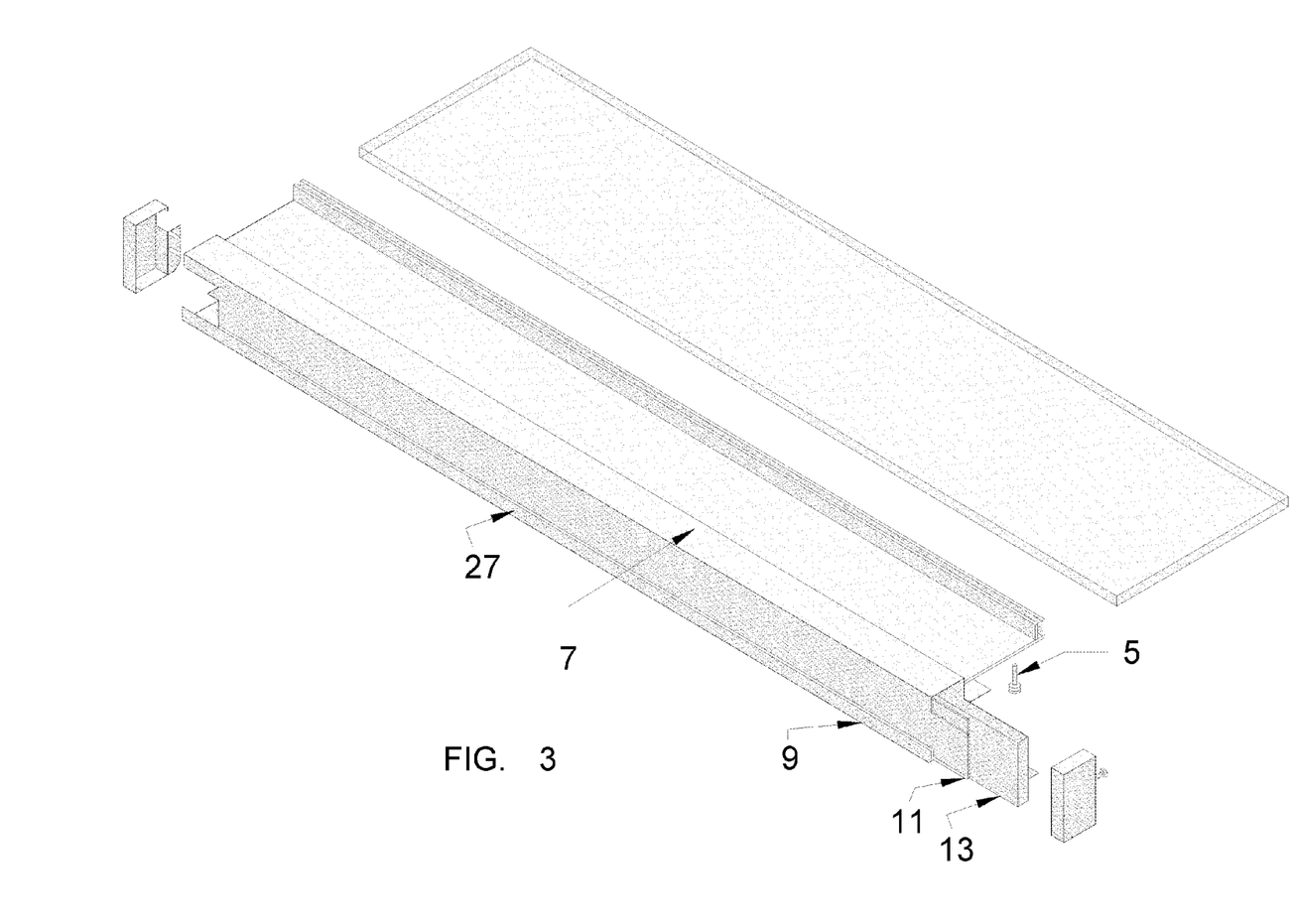
FIG. 3 depicts an exploded perspective view of the arrangement of components of a display element and shelf.
Figure 13:
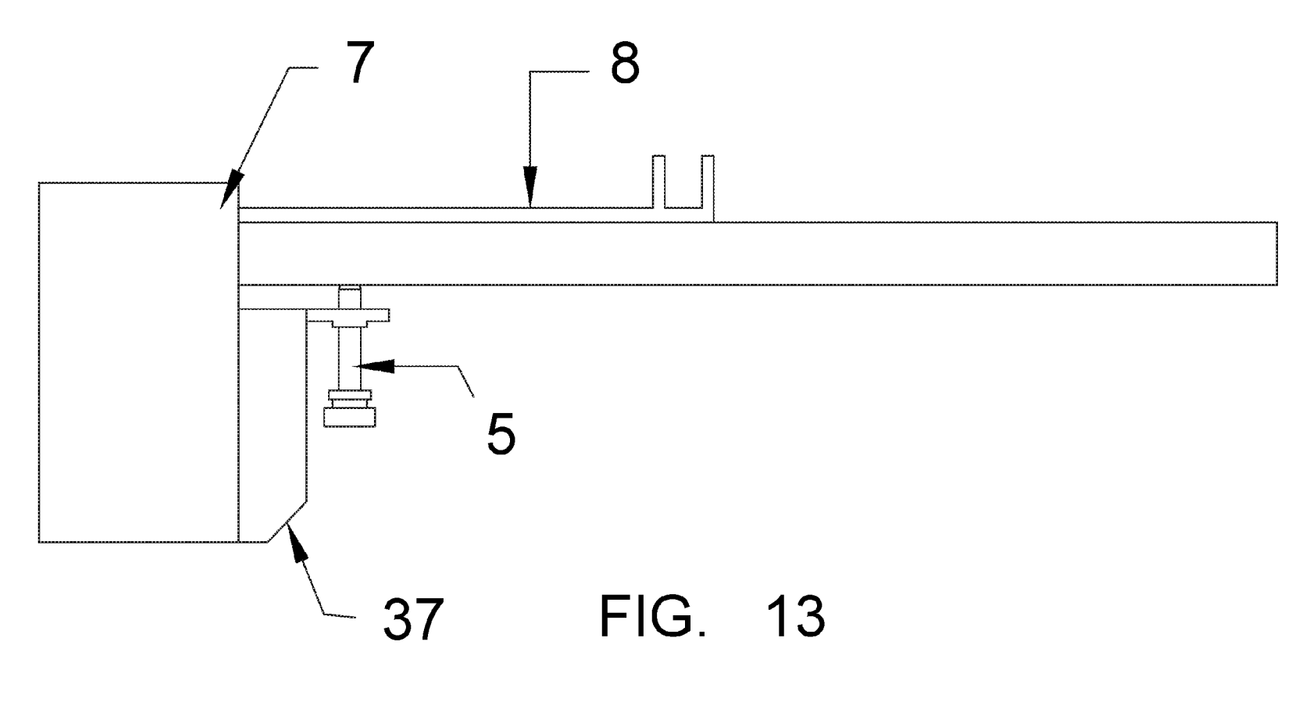
FIG. 13 shows an attachment mechanism of the present invention.
Figure 14:
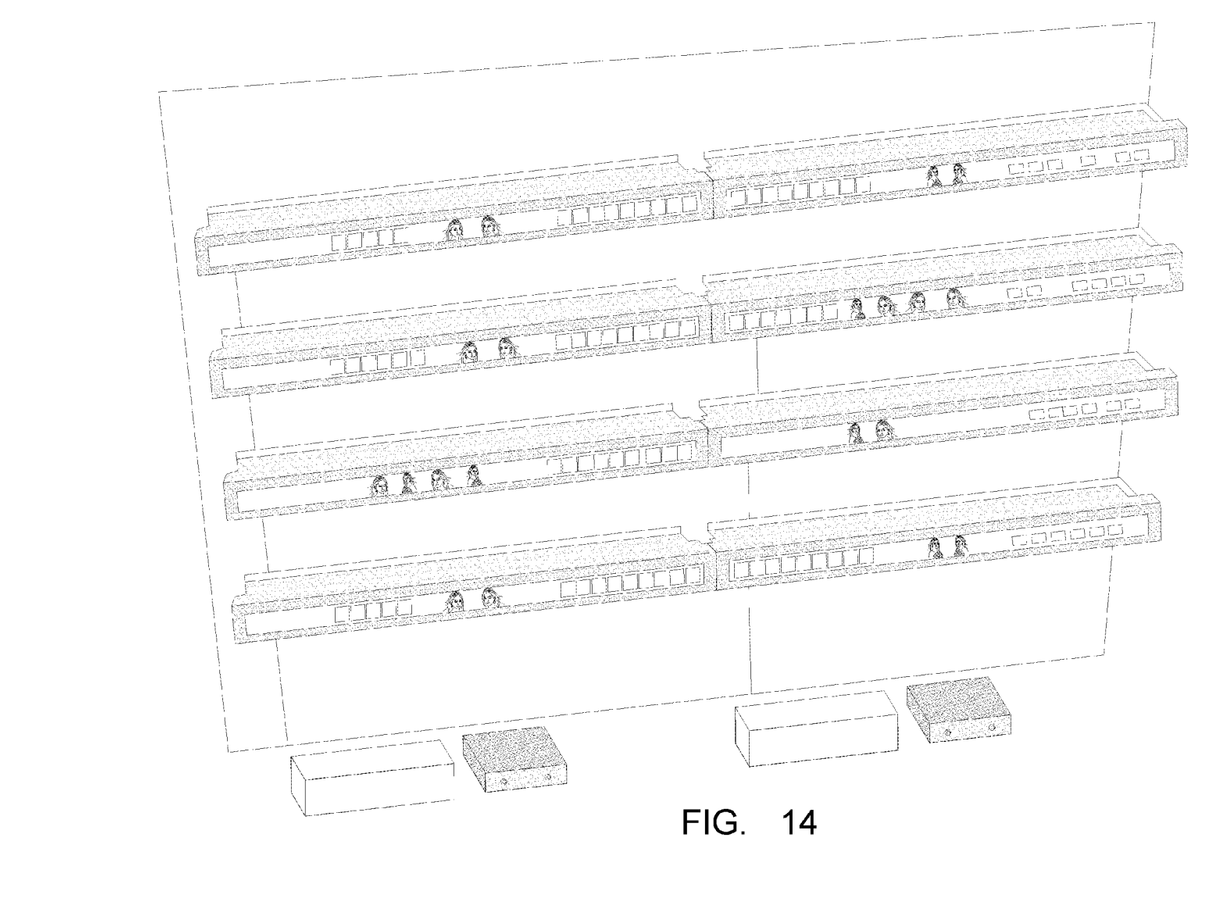
FIG. 14 is an embodiment of another display tier arrangement.

As depicted in FIG. 1, a tier, of plastic or metal shelves 3, preferably aluminum, individually shown in FIG. 2, constitutes a display assembly 1. FIG. 3 shows an exploded view of the arrangement of components of a display element 7 and shelf 3. The display element has an upper extension 8. The manner of physical connection of the display element 7 to the shelf is by sliding the display element's upper extension over the shelf and tightening a set screw 5. The configuration of the set screw is depicted in FIG. 13. It may also be noted in FIG. 13 the location of downward facing LEDs (not shown) at location 37 to provide illumination to the row below the level of the display element. The display element 7 comprises an aluminum extrusion 9 forming a bezel and an acrylic screen cover 11 behind which a display screen element 13 is located. As shown in FIG. 3, the display screen element 13 can be slid into place behind the acrylic screen cover 11. The display screen element 13 comprises an LED TV screen preferably having the following characteristics: an active display area of 885.6 mm×43.82 mm; an outline dimension of 910 mm×66 mm by a depth of 30 mm; pixel resolution of 1920×95; pixel pitch of 0.46125 mm×0.46125 mm; color depth of 1.07 B (Dithered 10 bit); an LED backlight system; luminance of 500 Cd/m$^2$; and a viewing angle (CR>10): R/L/U/D 178 (Typ.) These quantities may also be modified within 10% of the numbers quoted. The 910 mm length may be more substantially varied, e.g. by as much as 50%, in which case the pixel resolution may be 1920 by N, where N is determined by varying the pixel pitch in the vertical direction.

Figure 4:
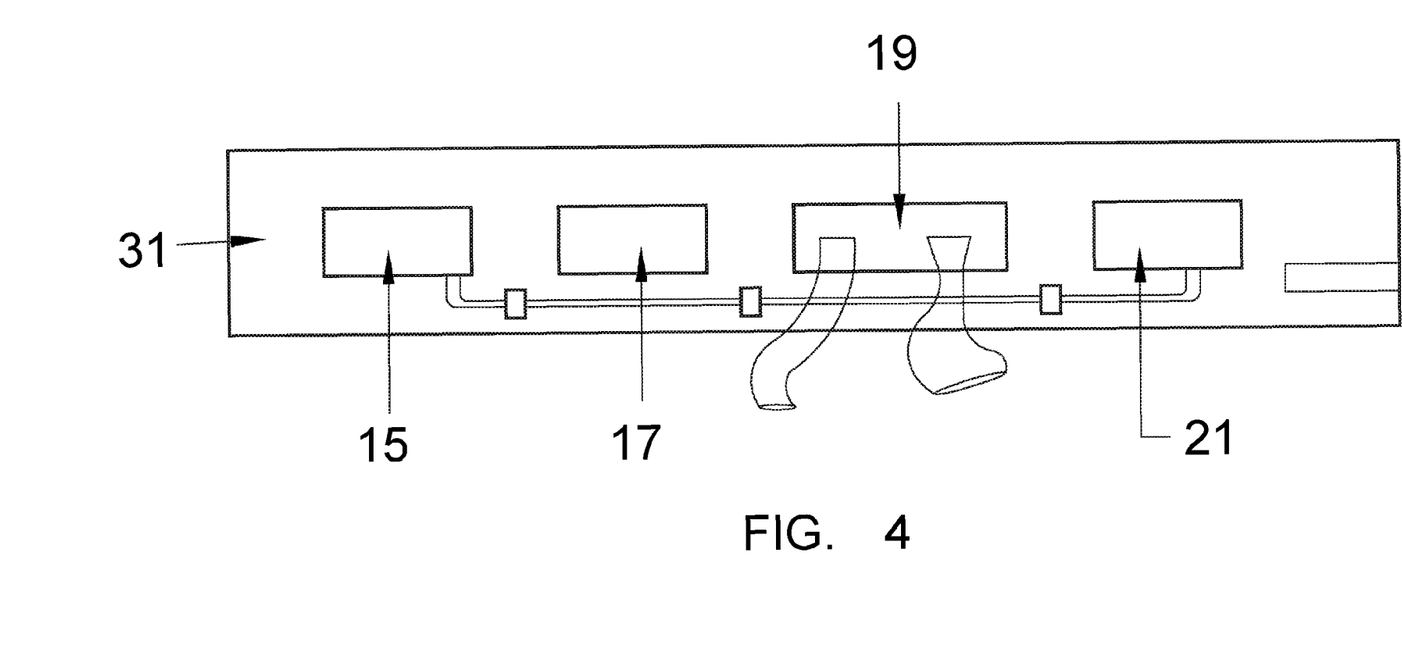
FIG. 4 is a rear view of the electronics package for the display element with its cover removed, showing the electronic components responsible for driving the TV image.
Figure 5:
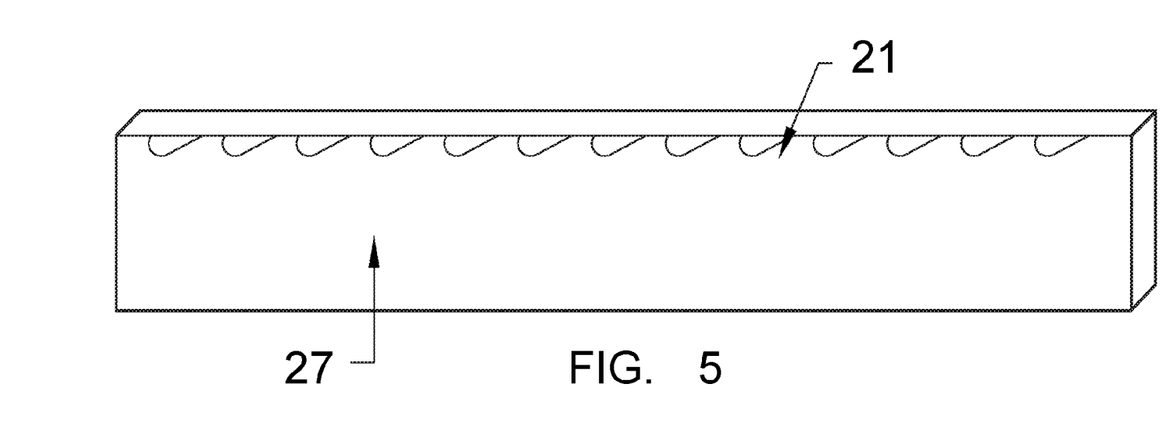
FIG. 5 is a back view of a display element showing the location of vertical LCD drivers.

FIG. 4 shows the component layout of the controller board 31 for the display element 13 with its cover removed. The components comprise an A/D board 15, LED Driver 17, a T CONN 19 from which strap connectors emerge to access column drivers shown in FIG. 5. The array drivers 21 shown in FIG. 5 are physically short so that the vertical dimension of the upper bezel covering of the display screen element 13 is the same as the vertical dimension of the lower bezel covering 25. It is this feature in conjunction with others that allows the display area 27 to be as large as possible.

In addition, the back cover 35 of the display element 13 is enabled by the arrangement of components to be as close as possible to the front face of the display element, thereby enabling the display assembly to be as close to the shelving as is feasible. This increases the useful shelf area of the display and stabilizes the system.

Figure 6:
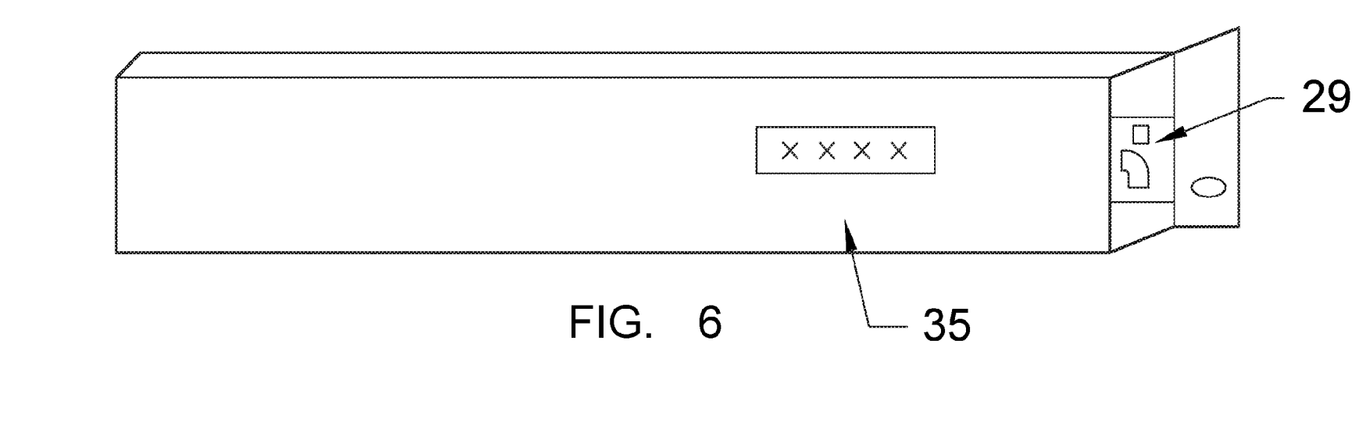
FIG. 6 is a cutaway back view of a display element showing the cover of the electronic components.

FIG. 6 is a cutaway back view of a display element showing the back cover 35 of the electronic controller board of the display element. The connector 29 may be used for daisy-chain connection of the different display structures on the various tier levels.

Figure 7:
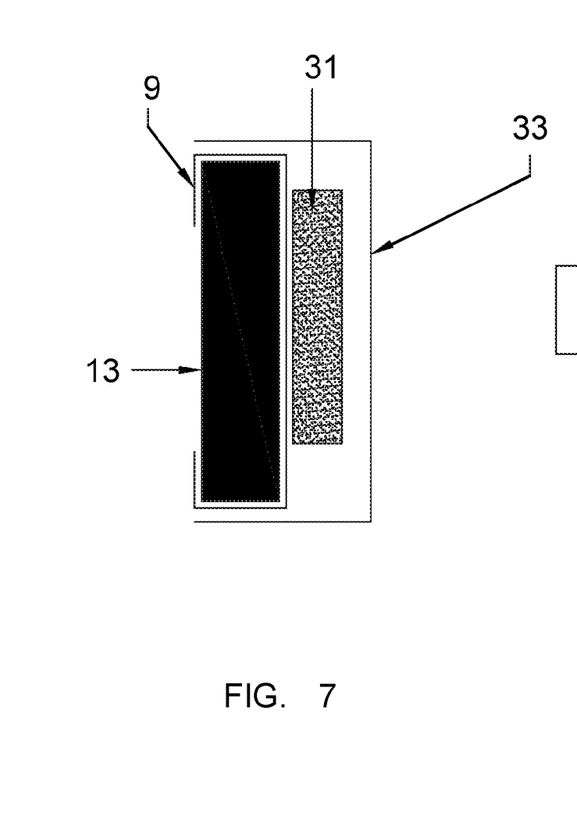
FIG. 7 and FIG. 8 depict placement of the display element and its electronics with respect to it covering element.
Figure 8:
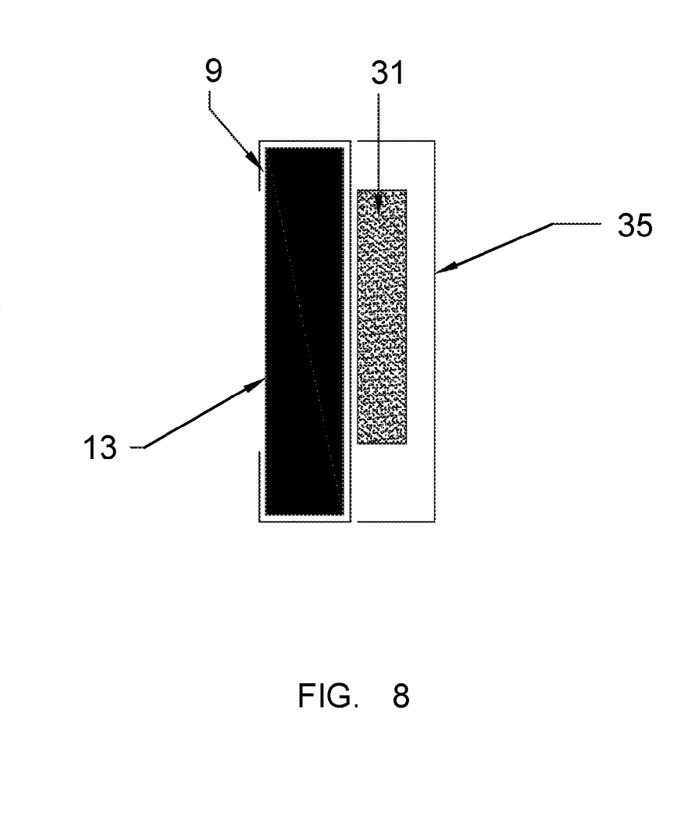
Figure 9:
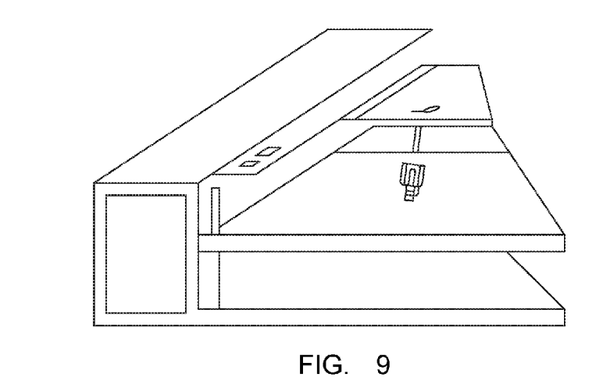
FIG. 9 is a perspective bottom view of an alternative display assembly.
Figure 10:
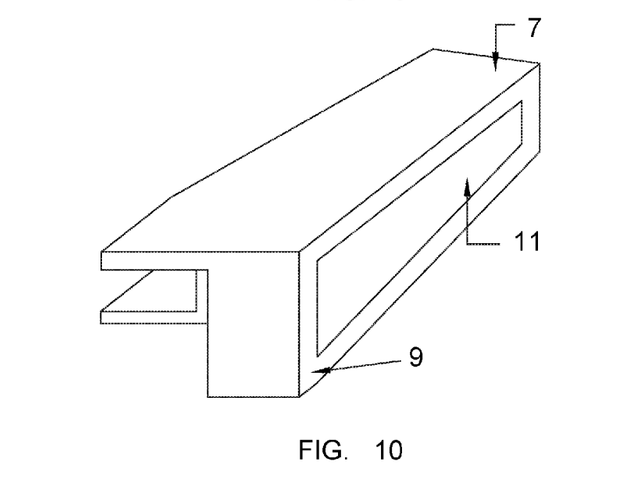
FIG. 10 is a perspective view of an alternative display assembly.
Figures 11, 12:
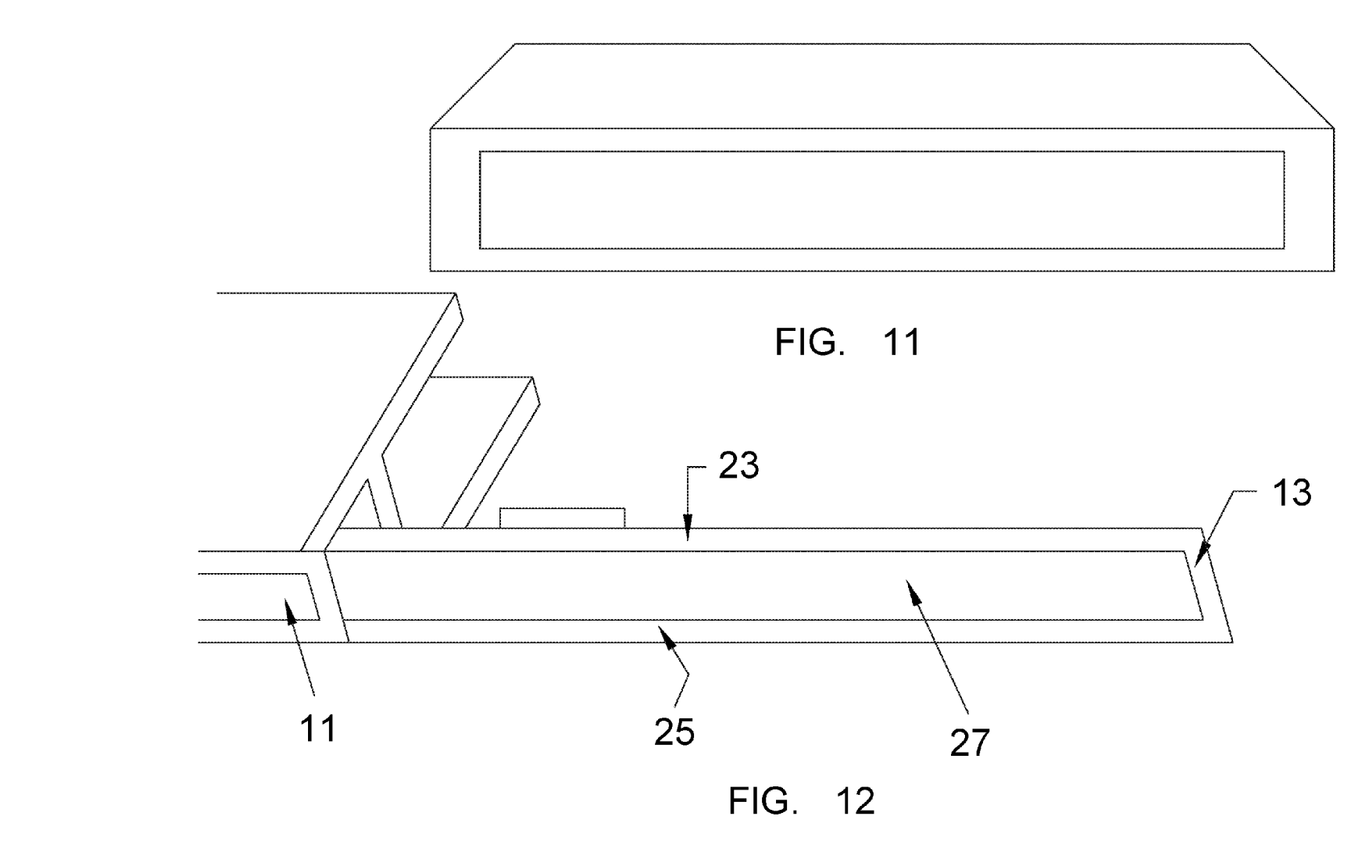
FIG. 11 is a front perspective view of an alternative display assembly.
FIG. 12 is a top perspective view of an alternative display assembly, with the display element partly removed.

FIG. 7 and FIG. 8 depict placement of the display element 13 and its electronic controller board 31 with respect to its covering element 33 or 35, respectively. The difference between the covering elements 33 and 35 is particularly significant. As shown in FIG. 7, where the covering element 33 extends to the face of the display element 13, it is necessary to sacrifice display area of the display element 13. On the contrary, as shown in FIG. 8, by terminating the covering element at the back of the display element, the display element 13 may extend further in the vertical direction. For these displays, that is a particularly significant extension and the additional area gained is quite noticeable. The vertical dimension of the active area is increased from 38 mm to 45 mm in a preferred embodiment.

FIGS. 9-12 show an alternative embodiment of the invention in which the shelf is captured between extended portions of the display casing.

In operation, the display is arranged by daisy chaining a series of displays, which can show a coordinated series of images in motion to attract customer interest. An example can be strips showing attractive figures in motion. The figures could be of segments of a full size image, with the viewer expected to interpolate the pieces of the image missing due to the separation of the shelves.

In addition, various additional features could be added to the display. The display could contain a camera capable of facial recognition of an approaching individual, not necessarily to identify the person, but to classify him/her by sex and age. The displayed image could then be one that is attractive to such an individual. Also, once the person's image is captured, it could be made part of the display.

The display could have a capacitive touch screen to allow the viewer to select or self-modify the image. A motion detection sensor could activate the screen as a customer approached.

In addition, the information displayed on the screen could be managed remotely, providing different images based upon sales criteria implemented algorithmically.

This disclosure provides examples of embodiments of the invention, including a best mode that enables persons skilled in the art to make and use the invention. However, the patentable scope of the invention is defined by the claims, and may include other embodiments that occur to those skilled in the art. Those examples are intended to be within the scope of the claims if they include equivalent structures to the elements stated in the claims.

What is claimed is:

1. A merchandise display assembly comprising a tier of horizontally elongated shelving for merchandise, said display assembly detachably coupled at each shelf to an LED TV display of the merchandise on that shelf, said display assembly comprising
  a plurality of rectangular elongated LED TV displays, each having a respective controller board within a covering element, each said LED TV display extending in front of and below its respective shelf for substantially the length of each shelf, wherein each display permits merchandise to be accessible above and behind the display on each shelf,
  wherein each elongated LED TV display comprises an LCD screen comprised of pixels backlit by white light emitting LEDs, and projecting white LED lighting to illuminate the merchandise under and below each LED TV display, said LED TV displays each driven by an elongated narrow HDMI controller, and
  wherein each tier row of electronic controllers is daisy chained to its next row so that all rows are driven by a single signal source, and
  wherein the covering element of each display element terminates at a back of said display element.

2. The merchandise display assembly of claim 1 wherein each LCD screen comprises a length of 1920 pixels.

3. The merchandise display assembly of claim 2 wherein each elongated LED-TV display comprises a bezel area with essentially equal vertical dimension bezel areas at the top and bottom thereof.

4. The merchandise display assembly of claim 2, where each rectangular elongated LED-TV display has a height substantially less than the vertical distance between said shelves, and has a depth substantially less than the depth of each said shelf.

5. The merchandise display assembly of claim 1 wherein each elongated LED-TV display comprises a bezel area with essentially equal vertical dimension bezel areas at the top and bottom thereof.

6. The merchandise display assembly of claim 1, where each rectangular elongated LED-TV display has a height substantially less than the vertical distance between said shelves, and has a depth substantially less than the depth of each said shelf.

* * * * *